(No Model.)  2 Sheets—Sheet 1.
A. J. HELLINGS & J. EVERETT.
MEAT CUTTING MACHINE.
No. 343,314. Patented June 8, 1886.
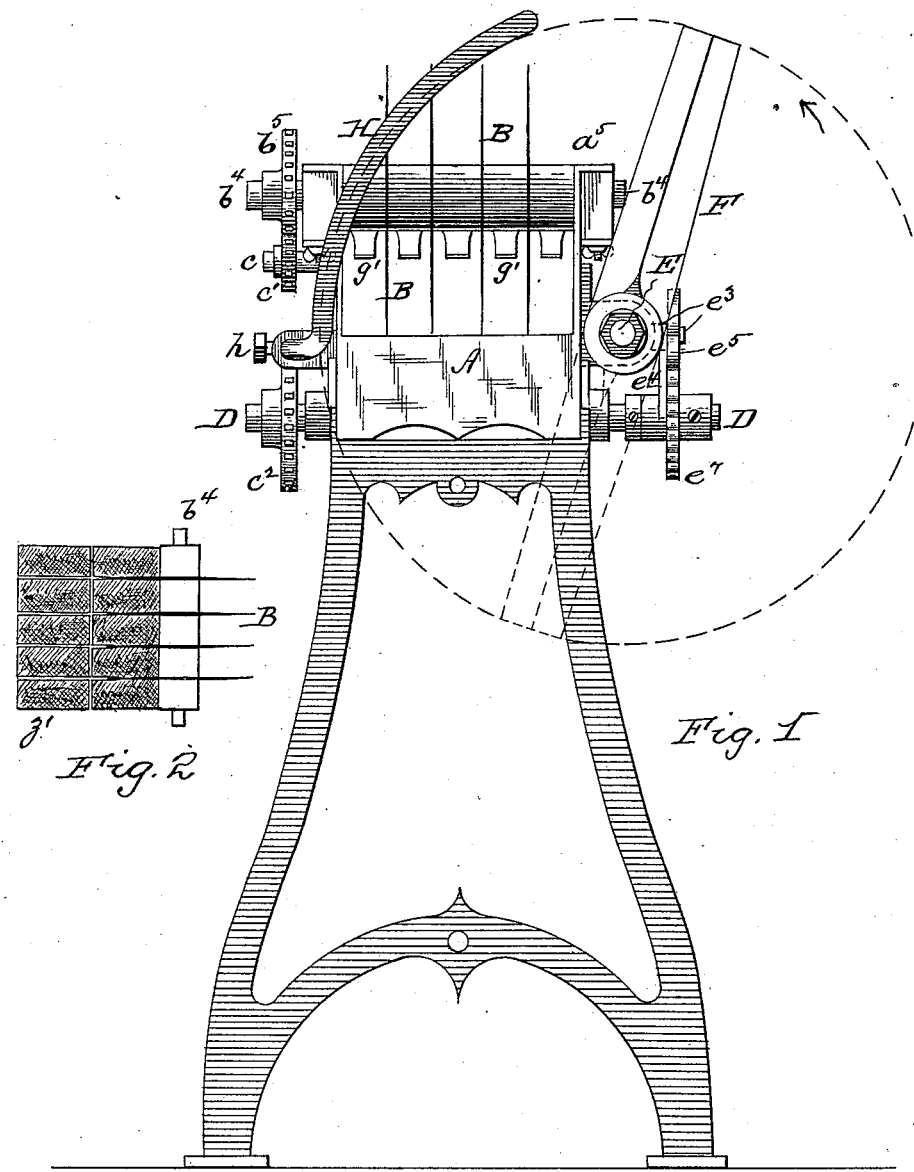
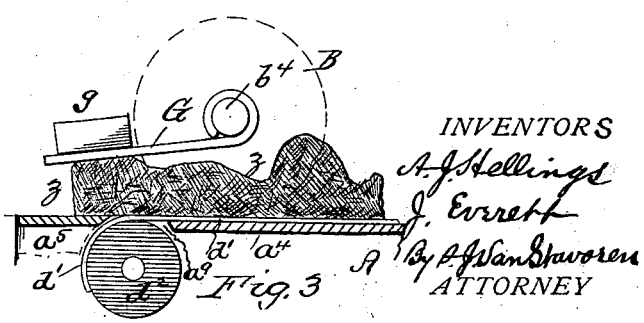
WITNESSES:
M. F. Hallock
T. F. Holden
INVENTORS
A. J. Hellings
J. Everett
By P. J. Van Staveren
ATTORNEY

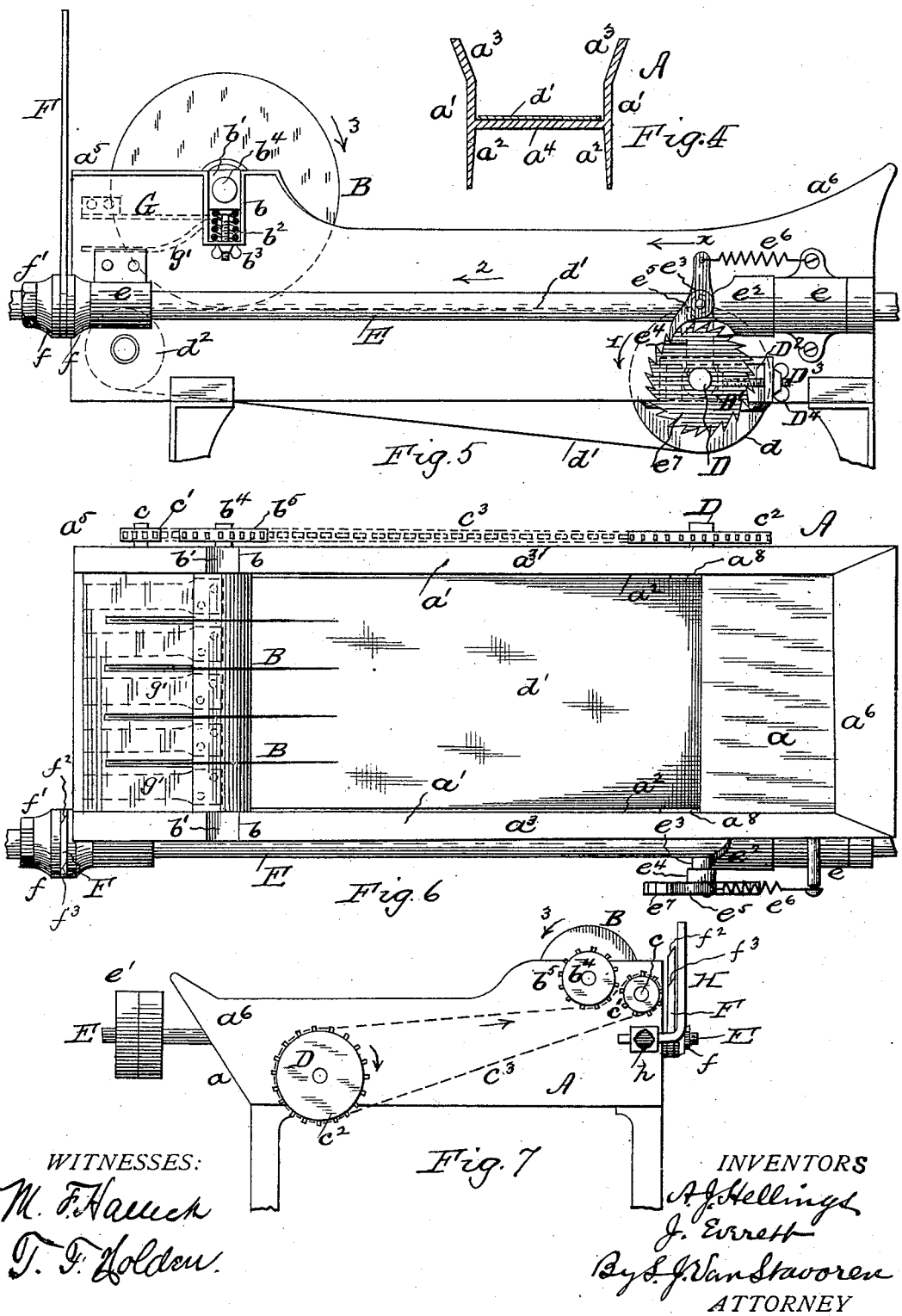

UNITED STATES PATENT OFFICE.

ANDREW J. HELLINGS AND JACOB EVERETT, OF PHILADELPHIA, PA.

MEAT-CUTTING MACHINE.

SPECIFICATION forming part of Letters Patent No. 343,314, dated June 8, 1886.

Application filed December 14, 1885. Serial No. 185,622. (No model.)

*To all whom it may concern:*

Be it known that we, ANDREW J. HELLINGS and JACOB EVERETT, citizens of the United States, residing at Philadelphia, in the county of Philadelphia and State of Pennsylvania, have invented certain new and useful Improvements in Meat-Cutting Machines, of which the following is a specification, reference being had therein to the accompanying drawings.

Our invention relates to machines for cutting fats, meats, or other similar or unlike material into cubical or rectangular pieces; and it has for its object to provide a simple and effective machine for accomplishing the desired result in an expeditious and economical manner.

Our invention accordingly consists of the combination, construction, and arrangement of parts comprising a meat-cutting machine, as hereinafter described and claimed, having reference particularly to the employment of rotary disks or circular cutters having a draw-cut for slicing or cutting the meat in one direction or in that parallel to the length of the machine, and to a rotating single or double edge knife for transversely dividing the cut slices of meat into cubes or rectangles; to rotary disks or circular cutters, and a traveling feed-apron therefor, having an intermittent motion, so as not to effect a cutting of the meat by said disks when the rotary knife is cutting the same; to a pressure or clamping device for holding down the meat as it passes through the rotary disks or circular cutters, so that it will not crowd or jam itself between the disks, and to prevent it buckling or doubling upon itself as it is fed toward and cut by the rotary knife.

Reference is to be had to the accompanying drawings, wherein Figure 1 represents an end view of the front of the machine. Fig. 2 is a plan of the rotary disks, and showing the cubical or rectangular form of the cut pieces of meat. Fig. 3 is a sectional detail elevation of rotary disks or circular cutters, pressure device, feeding-apron and one of its rollers, showing the operation of the pressure devices upon a piece of material of uneven thickness. Fig. 4 is a cross-section of the table of the machine and the feeding-apron. Fig. 5 is a side elevation of the machine, its supports being broken away. Fig. 6 is a plan of the same, and Fig. 7 is an elevation of the side of the machine opposite to that shown in Fig. 5, drawn to a reduced scale.

A represents the table of the machine, which is made trough shape, having a rear inclined end, $a$, and sides $a'$, which are preferably partly straight, as indicated at $a^2$, and partly flaring outwardly, as illustrated at $a^3$, Figs. 4 and 6, and it has a flat bottom, $a^4$, preferably located about midway between the top and bottom edges of its straight sides $a^2$ to keep it above the transverse shafts of the machine. This table may be made of any suitable material; but we prefer to make it of cast-iron in one piece, on account of economy of construction and the durability it gives to the machine, and also as it can, if made of metal, be more readily cleansed or made inodorous. At the forward end, $a^5$, of the table and in its sides are formed recesses $b$, which receive boxes or bearings $b'$, having preferably spring-supports $b^2$, with tension-screws $b^3$ for a shaft, $b^4$, upon which are suitably mounted a series of rotary disks or circular cutters, B, placed preferably at regular intervals apart. Upon one end of shaft $b^4$, and outside of table A, is secured a sprocket-wheel, $b^5$, adjacent to which, and mounted upon a pin or shaft, $c$, secured to the side of the table A, is another but smaller sprocket-wheel, $c'$. At the end $a^6$ of table A, below its bottom and in its sides, is mounted a transverse shaft, D, having at one end a sprocket-wheel, $c^2$, which is connected to sprocket-wheel $c'$ by a chain, $c^3$, the upper side of which passes under and engages with sprocket-wheel $b^5$, as plainly shown in Fig. 7.

Upon shaft D is secured a roller, $d$, for a traveling apron, $d'$, which passes to and over another roller, $d^2$, having its bearings in the sides of the table at its end $a^5$, and is located below its bottom, as shown in Fig. 5. The upper side of the apron moves along in contact with the top of the table-bottom $a^4$, which causes the apron to hold the meat up to the disks as it feeds the meat to them. A suitable opening, $a^8$, at the end $a^6$, (see Fig. 6,) and another like opening, $a^9$, at the end $a^5$ (see Fig. 3) of the table, are formed in its bottom $a^4$, to admit of the passage of the apron across said bottom. The traveling apron $d'$ is endless, and is made of any suitable flexible material—as, for instance, rubber, canvas, felt, or a combination of same—and the cutting-edges of the disks B are so located in relation to the apron that the disks just or slightly touch the apron to sink more or less into it to cut the meat, the apron being thick enough to prevent the disks cutting through it.

Upon the outside of the table, on the side opposite to that on which the sprocket-wheels $b^5$, $c'$, and $c^2$ are located, is a longitudinal shaft, E, suitably mounted in bearings $e$, secured to the table A, and having at one end a driving-wheel, $e'$, and at the other a knife, F, which is located immediately in front of or close to the end $a^5$ of the table, as shown, and cuts transversely across the same. Upon shaft E, adjacent to transverse shaft D, is secured a suitable cam, $e^2$, against which impinges a suitable stud or roller, $e^3$, mounted upon a bracket, $e^4$, swiveled or loosely secured to shaft D. To or upon stud $e^3$ is secured a pawl, $e^5$, having a suitable retracting-spring, $e^6$, and which is adapted to engage with a ratchet-wheel, $e^7$, on shaft D, so that when shaft E rotates the pitch of cam $e^2$ pushes roller-stud $e^3$ and pawl $e^5$ in the direction of arrow $x$, to communicate a partial rotary movement to shaft D for every revolution of shaft E. As soon as the stud $e^3$ and pawl $e^5$ have reached the limit of movement produced by the cam $e^2$, as indicated in Fig. 5, they are drawn back to follow the reverse pitch on said cam by spring $e^6$, so as to be in position to be pushed forward upon the succeeding revolution of shaft E. This described partial revolution given to shaft D is in turn, by roller $d$, communicated to the traveling or feeding apron $d'$, and by sprocket-wheel $c^2$ to the chain $c^3$. The speed of the apron and that of chain is that of the shaft D, but as the diameter of sprocket-wheel $b^5$ on disk-shaft $b^4$ is made smaller than that of the sprocket-wheel $c^2$ on shaft D, and the idler sprocket-wheel $c'$ being smaller than either of the wheels $b^5$ and $c^2$, it follows that the disks rotate with slightly greater speed, which is more or less, according to the proportionable diameters of said wheels, than is imparted to to the apron by the intermittent motion of shaft D. This difference of speed in the movement of the disks and apron causes the disks to make a draw-cut through the meat, which cut is more effective than a straight cut, as it is more easily made and cuts cleaner or does not tear the meat.

The knife F is secured to shaft E by means of collars $f$ and nut $f'$, both collars and knife being preferably keyed in any suitable manner to said shaft. As the latter revolves, the knife rotates therewith, and makes a cut across the end $a^5$ of the table for every revolution of the shaft.

The cutting action of knife F and that of disks B are so timed that when the disks are cutting the knife is moving to the position indicated by full lines in Fig. 1, or is then moving through that period of its revolution wherein it does not cut, and that when the knife is cutting the disks do not cut, as the cam $e^2$ then is on its back-stroke and does not rotate the shaft D, during which time it, and consequently the apron and disks, are then idle. This described interval between the time of cutting by the disks and that by the knife is provided to give the necessary or desired size for the pieces of cut meat.

The shaft D is intermittently rotated in direction of arrow 1, the apron $d'$ moves in the direction indicated by arrow 2, while the disks revolve in the direction represented by arrow 3, being caused to do so by attaching or connecting chain $c^3$ to the idler-sprocket $c'$. The knife F may have a single edge, $f^2$; but we prefer double or two cutting-edges, $f^2 f^3$, therefor, as shown, because when one becomes dull the knife can be reversed to present a fresh or sharp cutting-edge without necessitating its immediate removal from the machine for grinding purposes.

To prevent the meat as it is cut by the disks from crowding or jamming up between them, we use a pressure-plate, G, which is placed in advance of the disks B in the plane of the bottom of the collars, dividing or separating them, as shown more plainly in Fig. 5. This plate may be firmly fastened to the inner adjacent sides of the table, as illustrated.

As the meat (indicated at $z$, Fig. 3) to be cut by the disks is not always of an even thickness, the plate G should preferably be pivoted either to shaft $b^4$, as shown in Fig. 3, or otherwise, as desired, and be provided with a weight or spring, $g$, to cause it to yield to and press upon the varying thicknesses of the meat as it passes beyond the disks, to prevent it buckling or doubling up at that point as or after it is cut by the knife F. When a rigid plate, G, is used, spring-fingers $g'$ (see Fig. 5) may be employed in connection therewith, to press upon the varying thicknesses of the meat; or these fingers may be alone used for the purpose described, as shown in Figs. 1 and 6. To prevent the knife F bending outwardly at its end and away from the end of the machine or table A as the cut is made, we use a curved rigid pressure-bar, H, fastened to the opposite side of the table in advance of the knife F, and against which the end of the latter impinges as it cuts. This pressure-bar H may be made adjustable to and from the knife, to regulate the pressure-contact between them, and is held in position by means of a set-screw, $h$.

The operation is as follows: Motion being imparted to shaft E, it continuously revolves and rotates the knife F across the end $a^5$ of table once for each revolution of the shaft. When the knife is not cutting, the cam $e^2$ acts to impart a partial rotary motion to shaft D, to cause it to give an intermittent feeding motion to apron $d'$ and a like rotary motion to disks B at different speeds, to cause the latter to then make its draw cut, thereby preventing the cutting action of the disks interfering with that of the knife. The cut of one immediately following that of the other, the meat or fat can be fed through the machine very rapidly, and is cut into cubes or rectangles, as indicated at $z'$, Fig. 2. By providing a double or two bladed knife, F, as indicated by dotted and full lines, Fig. 1, the knife F will then make two cuts for every revolution of the shaft E, and in this case either the cam $e^2$ or the pawl $e^5$ will be so formed that a double or two partial rotations is imparted to shaft D during every revolution of shaft E.

The bearings or boxes D' for shaft D are preferably placed in suitable slots, $D^2$, in the sides of the table A, and have screws $D^3$ and adjusting-nuts $D^4$, to serve as tension devices for apron $d'$.

If desired, the feeding-apron and its rollers may be dispensed with, and in that case the meat is manually fed or pushed to the cutters, as desired. (See Fig. 7.)

As the different detail parts of our machine can be variously constructed, we do not limit ourselves to the construction shown and described; but

What we claim is—

1. In a meat-cutter, the combination of a horizontally-arranged trough or table, A, a series of cutters or disks, B, located near one end of the trough, an outside driving-shaft, E, parallel with the length of the trough, and having at one end a rotary knife, F, a transverse shaft located below the trough, and actuating devices between shafts E and D and between the latter and the shaft of disks B, subsantially as set forth.

2. In a meat-cutter, the combination of table or trough A, a series of rotary cutters or disks, B, a driving-shaft, E, having at its end nearest cutters B a rotary knife, F, and at its opposite end a cam, $e^2$, a counter-shaft, D, endless apron $d'$, passing around shaft D, pawl-and-ratchet mechanism between cam $e^2$ and shaft D, and actuating devices between the latter and the shaft of disks B, substantially as set forth.

3. In a meat-cutter, the combination of table or trough A, the rotary cutters or disks B, having spring-supported shaft-bearings provided with adjusting devices, an endless apron, $d'$, having roller-shaft D, provided with tension or adjusting mechanism, driving-shaft E, at right angles to shaft D, and having rotary knife F, and actuating mechanism between shafts E and D and between the latter and the shaft of cutters B, substantially as set forth.

4. A meat-cutter having rotary cutter-disks, an endless traveling feeding-apron extending past the cutters and in contact therewith, and actuating mechanism for moving the disks and apron at different rates of speed to impart a draw cut to the disks, substantially as set forth.

5. In a meat-cutter, the combination of intermittent rotary cutter-disks, a feeding-trough, and a continuously-rotating knife cutting across the front end of the feeding-trough in advance of the rotary cutting-disks, and actuating devices for said rotary cutters and knife, substantially as set forth.

6. The combination, in a cutting-machine, of a feed-trough, intermittent rotary cutter-disks, intermittent traveling apron extending past the cutter-disks, a rotary knife cutting at right angles to the cutter-disks, and actuating mechanism for the disks, apron, and knife, substantially as set forth.

7. In a meat-cutting machine, the combination of rotary cutter-disks, a rotary knife cutting at right angles to the disks, an endless traveling apron, actuating devices for said cutter-disks, knife, and apron, and a metal table or frame having sides $a'$, composed of vertically-straight parts $a^2$ and outwardly flaring or divergent parts $a^3$, inclined rear end, $a$, open front $a^5$, and a bottom, $a^4$, located at or near the middle of the straight part $a^2$ of the sides of the table, substantially as shown and described.

8. In a meat-cutting machine, the combination of rotary cutter-disks, a rotary knife cutting at right angles to said disks, an endless traveling feed-apron, actuating devices for said parts, and a table or frame having sides $a'$, composed of vertically-straight parts $a^2$ and outwardly flaring or divergent parts $a^3$, inclined rear end, $a$, open front end, $a^5$, and a bottom, $a^4$, located at or near the middle of the straight parts, $a^2$ of the sides of the table, and having openings $a^8$ $a^9$, substantially as and for the purpose set forth.

9. The combination of disks or cutters B, table A, having bottom $a^4$, the front end of which extends beyond the cutters B, endless feeding-apron $d'$, traveling over the top of bottom $a^4$ and past the cutters B, knife F, cutting transversely across the line of cut of the disks B, and actuating devices, substantially as set forth.

10. The combination of table A, rotary shaft E, having cutter F, arranged to cut at right angles to the axial line of the shaft, disks or cutters B upon shaft $b^4$, transverse shaft D, traveling apron $d'$, moving past the disks B and in contact therewith, actuating devices between shafts E and D and between the latter and shaft $b^4$, substantially as set forth.

11. The combination of circular cutters B, rotary knife F, adapted to cut across the line of cut of the cutters, and a pivoted or hinged pressure-plate, G, as set forth.

12. A meat-cutting machine having circular cutters, an endless traveling feed-apron moving past the cutters, a rotary knife cutting across the line of the cutters, and a yielding pressure bar or plate interposed between the cutters and knife, substantially as set forth.

13. A meat-cutting machine having circular collars or disks, an endless feed-apron moving past the disks, a rotary knife cutting across the line of cut of the disks, a pressure-bar for the end of the knife, and a yielding pressure-plate interposed between the disks and knife, substantially as set forth.

14. The combination of table A, having open end $a^5$, circular cutters or disks on shaft $b^4$, having spring-supported adjustable bearings, transverse shaft D, feeding-apron $d'$, sprocket-wheel and chain-connection between shaft D and shaft $b^4$, the shaft E, having knife F, rotating across the end $a^5$ of table A, and actuating devices between shafts E and D, for imparting to the latter an intermittent rotary movement, as set forth.

15. In a meat-cutter, the combination of a table or trough, A, rotary cutters or disks B, continuously-rotating driving-shaft E, having knife F cutting at right angles to disks B, an endless feed-apron, $d'$, roller $d^2$, shaft D, having roller $d$ for said apron, and devices between shafts E and D and between the latter and the shaft of disks B for imparting an intermittent rotary movement to said apron and disks, substantially as set forth.

16. The combination of table A, cutters or disks B, in gear with a shaft, D, endless apron $d'$, shaft E, having knife F and cam $e^2$, and a pawl-and-ratchet mechanism, with retracting spring interposed between cam $e^2$ and shaft D, as set forth.

In testimony whereof we affix our signatures in presence of two witnesses.

ANDREW J. HELLINGS.
JACOB EVERETT.

Witnesses:
S. J. VAN STAVOREN,
CHAS. F. VAN HORN.